United States Patent
Suzuki

(10) Patent No.: US 8,599,662 B2
(45) Date of Patent: Dec. 3, 2013

(54) REPRODUCING DEVICE AND REPRODUCING METHOD

(75) Inventor: Yuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 12/873,522

(22) Filed: Sep. 1, 2010

(65) Prior Publication Data

US 2011/0063962 A1 Mar. 17, 2011

(30) Foreign Application Priority Data

Sep. 14, 2009 (JP) ................................. 2009-211287

(51) Int. Cl.
*G11B 7/00* (2006.01)

(52) U.S. Cl.
USPC .................. 369/47.5; 369/53.26; 369/116

(58) Field of Classification Search
USPC ............ 369/53.35, 47.5, 47.51, 47.52, 53.26, 369/116, 47.53
See application file for complete search history.

(56) References Cited

U.S. PATENT DOCUMENTS

| 7,327,666 | B2 * | 2/2008 | Tanaka ....................... 369/275.2 |
| 7,636,285 | B2 * | 12/2009 | Tokiwa ....................... 369/53.22 |
| 2002/0064114 | A1 * | 5/2002 | Sakata et al. ................ 369/53.26 |
| 2002/0064124 | A1 * | 5/2002 | Yamamoto et al. ......... 369/275.3 |
| 2004/0022152 | A1 * | 2/2004 | Hayashi ....................... 369/53.2 |
| 2004/0085874 | A1 * | 5/2004 | Akiyama et al. ........... 369/47.53 |
| 2004/0240373 | A1 * | 12/2004 | Tanaka ....................... 369/272.1 |
| 2006/0140085 | A1 * | 6/2006 | Mashimo ..................... 369/47.5 |
| 2009/0067313 | A1 * | 3/2009 | Shiono et al. ............. 369/112.01 |
| 2009/0161502 | A1 * | 6/2009 | Shiono ....................... 369/44.22 |
| 2009/0310469 | A1 * | 12/2009 | Yanagisawa et al. .... 369/112.23 |

FOREIGN PATENT DOCUMENTS

JP 2008-243339 A 10/2008

* cited by examiner

*Primary Examiner* — Thomas Alunkal
(74) *Attorney, Agent, or Firm* — Wolf, Greenfield & Sacks, P.C.

(57) ABSTRACT

A reproducing device includes: a laser light irradiating section; a correction coefficient information retaining section; a correction coefficient obtaining section; a laser power setting section; and a driving signal outputting section.

6 Claims, 13 Drawing Sheets

F I G . 2
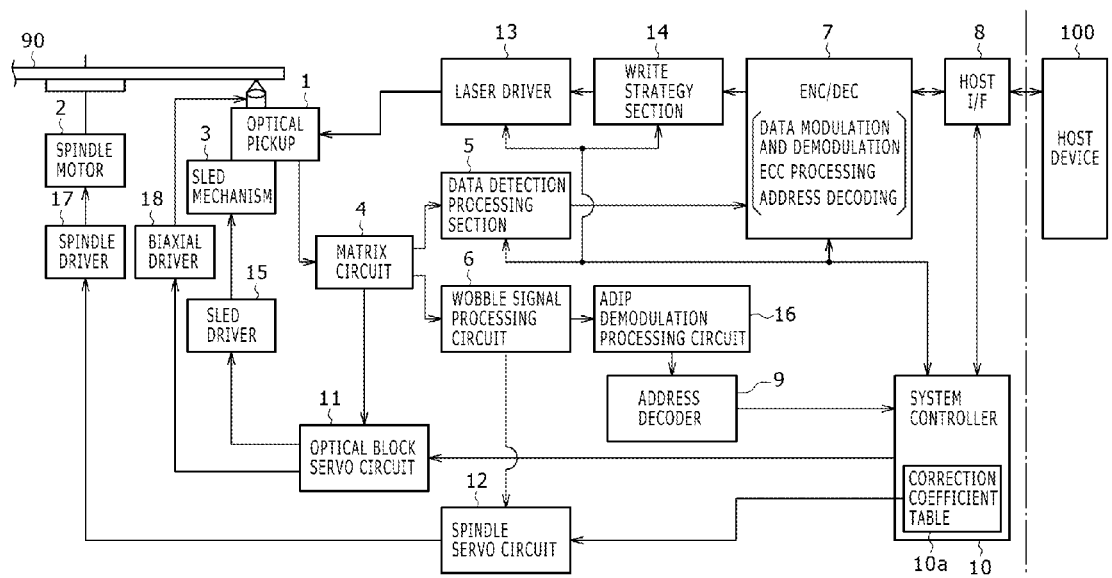

$Tr = r1 * r2 * r3$ $Tr = r2 * r3$ $Tr = r3$ $Tr = 1$

LEGEND
▨▨▨ RECORDED
☐ UNRECORDED

| | | REPRODUCTION OBJECT RECORDING LAYER | | | |
|---|---|---|---|---|---|
| | | L0 | L1 | L2 | L3 |
| LAYER STATE PATTERN | [L0 / L1, L2, L3] | 1/(r1*r2*r3) | ---- | ---- | ---- |
| | [L0, L1 / L2, L3] | 1/(r2*r3) | 1/(r2*r3) | ---- | ---- |
| | [L0, L1, L2 / L3] | 1/r3 | 1/r3 | 1/r3 | ---- |
| | [L0, L1, L2, L3 / --] | 1 | 1 | 1 | 1 |

[RECORDED STATE/UNRECORDED STATE]

F I G . 9

|  | | REPRODUCTION OBJECT RECORDING LAYER | | | |
| --- | --- | --- | --- | --- | --- |
|  | | L0 | L1 | L2 | L3 |
| LAYER STATE PATTERN 1 | [L0 / L1, L2, L3] | 1/(r1*r2*r3) | ---- | ---- | ---- |
|  | [L0, L1 / L2, L3] | 1/(r2*r3) | 1/(r2*r3) | ---- | ---- |
|  | [L0, L1, L2 / L3] | 1/r3 | 1/r3 | 1/r3 | ---- |
|  | [L0, L1, L2, L3 / --] | 1 | 1 | 1 | 1 |
| LAYER STATE PATTERN 2 | [L0, L1, L3 / L2] | 1/r2 | 1/r2 | ---- | ---- |
|  | [L0, L2, L3 / L1] | 1/r1 | ---- | ---- | ---- |
|  | [L0, L2 / L1, L3] | 1/(r1*r3) | ---- | ---- | ---- |
|  | [L0, L3 / L1, L2] | 1/(r1*r2) | ---- | ---- | ---- |

[RECORDED STATE/UNRECORDED STATE]

REPRODUCING DEVICE AND REPRODUCING METHOD

BACKGROUND OF THE INVENTION

1. Field of the Invention

The present invention relates to for example a reproducing device that performs reproduction so as to support an optical disk-shaped recording medium and a method thereof.

2. Description of the Related Art

For example, optical disk-shaped recording media (hereinafter referred to also as optical disks) such as a Blu-ray Disc (registered trademark) having a physical structure formed by laminating two recording layers have already been commercialized.

For favorable recording and reproduction on an optical disk, the laser power of laser light applied to the recording layers needs to be set appropriately.

Then, for example, light transmittance differs in each layer of an optical disk of the above-described two-layer structure. This means that to be exact, an appropriate laser power differs for each layer, and that therefore recording and reproduction should ideally be performed after changing and setting an appropriate laser power for each layer.

Japanese Patent Laid-Open No. 2008-243339 describes the following "recording" on an optical disk having two or more recording layers.

Specifically, the film thickness information of reflective layers of an optical disk produced by a semitransparent film is obtained from prepackaged firmware of an optical disk device or the optical disk storing the film thickness information in advance, and a recording power adjustment coefficient is calculated. Then, using the calculated adjustment coefficient, recording start power of a second layer or a subsequent layer and write-once start power at a write-once time are set as recording power.

However, in actuality, recording and reproduction on an optical disk of a two-layer structure in the past has been performed as follows without changing laser power.

As one example, for a recording layer on a surface side (outer layer side) of two layers, a limitation within a certain range is imposed on for example a material forming the layer, semi-reflective film characteristics and the like by specifications. That is, by manufacturing the optical disk with the above-described characteristics confined within the range of the specifications, the light transmittance of the recording layer on the outer layer side is secured to such a degree that no problem occurs even when recording and reproduction are performed on the outer layer side and the inner layer side with a same laser power.

As another example, a method is known in which recording and reproduction are performed after recording (formatting) the entire region of the recording layer on the outer layer side. A recording layer in a recorded state has a higher light transmittance than a recording layer in an unrecorded state. Accordingly, a high light transmittance is secured by first setting the entire region on the outer layer side in the recorded state, and thereafter recording and reproduction are performed on the inner layer side with a same laser power.

SUMMARY OF THE INVENTION

However, when there are three or more recording layers, one or more layers are interposed between two layers as a relation between the layers. In this case, difference in light transmittance is increased according to the number of layers present between the two layers. Then, for an optical recording medium of three layers or more, it is practically very difficult to confine the difference in light transmittance within a tolerable range by the method of setting a same laser power so as to support the above-described two-layer structure. That is, it is not practical to adopt the above-described method so as to support optical disks of three layers or more.

Accordingly, the present invention proposes a method and a configuration actually effective when three or more layers, in particular, are assumed for reproduction supporting multilayer optical recording media.

Accordingly, in consideration of the above-described problems, an embodiment of the present invention is configured as follows as a reproducing device.

The reproducing device includes: laser light irradiating means for emitting laser light for reproduction, one of n (n is a natural number of two or more) layers formed in an optical recording medium being set as a reproduction object; correction coefficient information retaining means for retaining correction coefficient information including a correction coefficient for laser power, the correction coefficient being associated with a combination of a reproduction object recording layer and a recorded/unrecorded state pattern of each transmitting recording layer transmitting the laser light before the laser light reaches the reproduction object recording layer; correction coefficient obtaining means for obtaining a correction coefficient corresponding to a combination of a present reproduction object recording layer and a recorded/unrecorded state pattern of each present transmitting recording layer from the correction coefficient information retaining means; laser power setting means for determining a correction coefficient for a reference value of the laser power for the laser light for the reproduction on a basis of the correction coefficient obtained by the correction coefficient obtaining means, and setting the laser power corrected by the determined correction coefficient; and driving signal outputting means for outputting a driving signal for emitting the laser light from the laser light irradiating means so as to emit the laser light with the set laser power.

The above-described constitution corrects the laser power when the optical recording medium is reproduced on the basis of the correction coefficient corresponding to the combination of the present reproduction object recording layer and the recorded/unrecorded state pattern of each present transmitting recording layer.

According to another embodiment of the present invention, there is provided a reproducing method including: a driving signal outputting step of outputting a driving signal for emitting laser light from laser light irradiating means for emitting the laser light, one of n (n is a natural number of two or more) layers formed in an optical recording medium being set as a reproduction object, and varying the driving signal so as to emit the laser light with a set laser power; a correction coefficient information retaining step of retaining correction coefficient information including a correction coefficient for the laser power, the correction coefficient being associated with a combination of a reproduction object recording layer and a recorded/unrecorded state pattern of each transmitting recording layer transmitting the laser light before the laser light reaches the reproduction object recording layer; a correction coefficient obtaining step of obtaining a correction coefficient corresponding to a combination of a present reproduction object recording layer and a recorded/unrecorded state pattern of each present transmitting recording layer from the correction coefficient information retained in the correction coefficient information retaining step; and a laser power setting step of determining a correction coefficient for a reference value of the laser power for the laser light for the reproduction on a basis of the correction coefficient obtained in the correction coefficient obtaining step, and setting the laser power corrected by the determined correction coefficient.

The present invention thereby makes it possible to set an appropriate laser power according to difference in light transmittance in transmitting recording layers differing according to a recording layer set as a reproduction object in reproducing an optical disk of a multilayer structure.

BRIEF DESCRIPTION OF THE DRAWINGS

FIG. 2 is a block diagram showing an example of a configuration of the disk drive device according to the present embodiment;

FIG. 6 is a diagram showing an example of contents of a correction coefficient table corresponding to a first example of the embodiment;

FIG. 9 is a diagram showing an example of contents of a correction coefficient table corresponding to a second example (and a third example) of the embodiment;

DETAILED DESCRIPTION OF THE PREFERRED EMBODIMENT

The mode for carrying out the present invention (hereinafter referred to as a present embodiment) will hereinafter be described in the following order.
<1. Example of Disk Structure>
<2. Example of Configuration of Disk Drive Device>
<3. Configuration of Optical System and Control System Therefor>
<4. Laser Power Correction According to Present Embodiment>
[4-1. Relative Transmittance]
[4-2. Laser Power Correction (First Example)]
[4-3. Laser Power Correction (Second Example)]
[4-4. Laser Power Correction (Third Example)]

1. Example of Disk Structure

Figure 1A:
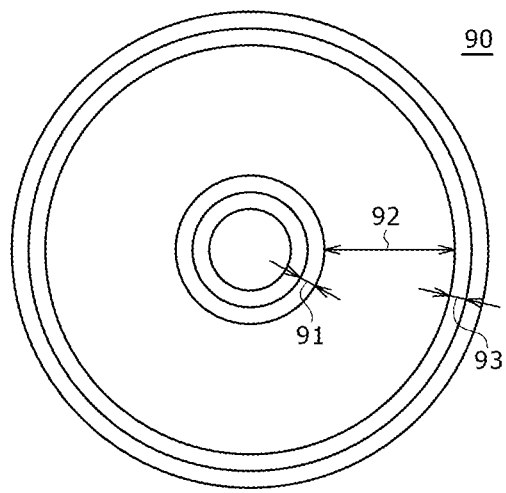
FIGS. 1A and 1B are diagrams showing an example of a structure of an optical disk supported by a disk drive device according to a present embodiment.

FIG. 1A is a plan view of an optical disk-shaped recording medium (optical disk) 90 supported by a reproducing device according to the present embodiment, showing an area configuration in the direction of the radius of the optical disk-shaped recording medium.

The optical disk 90 is for example a disk recording medium having a diameter of 12 cm. The area structure of the optical disk 90 is roughly divided into an inner circumference area 91, a data zone 92, and an outer circumference area 93.

The data zone 92 is a main recording area in which so-called user data is recorded. The user data in this case refers to data as a main object for storage using the optical disk 90, such as video data, audio data, text data, computer use data, and software programs.

The inner circumference area 91 is used as a so-called managing region.

Incidentally, in the case of a single-layer disk having one recording layer, the inner circumference area 91 is a region used as a so-called lead-in zone. In the case of a multilayer disk having a plurality of recording layers, the inner circumference area in each layer is used as a lead-in zone, an inner zone, a lead-out zone or the like. Formed in the inner circumference area 91 are physical information on the disk, setting information for recording and reproducing operation, information for managing a region configuration and replacement, a trial writing region and the like.

The outer circumference area 93 is a region used as a so-called lead-out zone in the case of a single-layer disk. In the case of a multilayer disk having a plurality of recording layers, the outer circumference area in each layer is used as a lead-out zone or an outer zone.

Incidentally, the present embodiment supposes a recordable disk as a write-once disk or a rewritable disk.

Figure 1B:
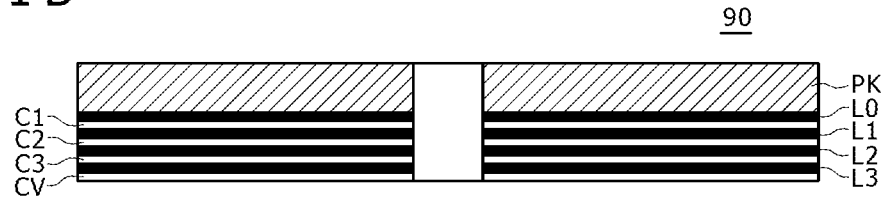

FIG. 1B schematically shows a layer structure when the optical disk 90 is a four-layer disk.

The optical disk 90 for example has a first recording layer L0 formed therein by forming a projection and depression shape as a wobbling groove on one surface of a disk substrate PK molded by injection molding or the like using polycarbonate or the like and forming a reflective film and a recording material layer on the projection and depression shape.

An intermediate layer C1 is further formed on the first recording layer L0. A second recording layer L1 is formed by forming a projection and depression shape as a wobbling groove on a surface of the intermediate layer C1 and forming a semitransparent reflective film and a recording material layer on the projection and depression shape.

An intermediate layer C2 is further formed on the recording layer L1. A third recording layer L2 is formed by forming a projection and depression shape as a wobbling groove on a surface of the intermediate layer C2 and forming a semitransparent reflective film and a recording material layer on the projection and depression shape.

An intermediate layer C3 is further formed on the recording layer L2. A fourth recording layer L3 is formed by forming a projection and depression shape as a wobbling groove on a surface of the intermediate layer C3 and forming a semitransparent reflective film and a recording material layer on the projection and depression shape.

A cover layer CV is formed on the recording layer L3.

Incidentally, each recording layer L0, L1, L2, and L3 has a part where an embossed pit train is formed such as a part of the inner circumference area 91.

In practice, the optical disk 90 has a thickness of about 1.2 mm, and the disk substrate PK has a thickness of about 1.1 mm. The part from the recording layer L0 to the cover layer CV is formed between the thickness of about 100 μm. Incidentally, because decrease in interlayer distance between the recording layers increases effects of stray light and crosstalk, the innermost recording layer (L0) may be formed at a position 100 μm+a few μm from a surface on the side of the cover layer CV in the multilayer medium.

Incidentally, while FIG. 1B illustrates an example of a four-layer disk, a three-layer disk and disks of five layers and more are formed by a similar structure with the thickness and the like of intermediate layers and a cover layer adjusted. In the present embodiment, however, the following description will be made by taking the four-layer disk shown in FIG. 1B as an example.

In addition, L0, L1, L2, and L3 shown in FIG. 1B are references given to the four respective recording layers. In the following description, the notations of the recording layer L0, the recording layer L1, the recording layer L2, and the recording layer L3 using the references will be treated also as the names of the respective recording layers in the following description.

2. Example of Configuration of Disk Drive Device

Description will next be made of a disk drive device that performs recording and reproduction so as to support the optical disk 90 according to the present embodiment.

Suppose that the disk drive device according to the present embodiment can perform reproduction and recording so as to support a reproduction-only disk and a recordable type disk (write-once disks and rewritable disks) as Blu-ray Disc standards. Incidentally, as described above, the optical disk 90 shown in FIGS. 1A and 1B as an optical disk corresponding to the present embodiment is a recordable type disk.

In the case of the recordable type disk, phase change marks or dye change marks are recorded and reproduced under conditions of a combination of a laser having a wavelength of 405 nm (so-called blue laser) and an objective lens having an NA of 0.85. The recording and reproduction is performed using a data block of 64 KB (kilobytes) as one recording and reproducing unit (RUB: Recording Unit Block) with a track pitch of 0.32 μm and a linear density of 0.12 μm/bit.

Incidentally, as for the reproduction-only disk, reproduction-only data is recorded by embossed pits having a depth of about λ/4. The reproduction-only disk similarly has a track pitch of 0.32 μm and a linear density of 0.12 μm/bit. A data block of 64 KB is handled as one reproducing unit (RUB).

The RUB as a recording and reproducing unit is 498 frames in total generated by for example adding a link area of one frame in front of and in the rear of an ECC block (cluster) of 156 symbols×496 frames.

Incidentally, in the case of the recordable type disk, a groove is formed in a wobbling manner on the disk, and the wobbling groove is used as a recording and reproducing track. The wobbling of the groove includes so-called ADIP (Address in Pregroove) data. That is, an address on the disk can be obtained by detecting the wobbling information of the groove.

In the case of the recordable type disk, recording marks formed by phase change marks are recorded on the track formed by the wobbling groove. The phase change marks are recorded with a linear density of 0.12 μm/bit and 0.08 μm/ch bit by an RLL(1, 7)PP modulation system (RLL: Run Length Limited, PP: Parity preserve/Prohibit rmtr (repeated minimum transition runlength)) or the like.

Supposing that a channel clock cycle is "T," a mark length is 2 T to 8 T.

In the case of the reproduction-only disk, no groove is formed, but data similarly modulated by the RLL(1, 7)PP modulation system is recorded as an embossed pit train.

FIG. 2 shows an example of configuration of a disk drive device capable of performing recording/reproduction so as to support the optical disk 90 in the above-described format.

When the optical disk 90 corresponding to the present embodiment is loaded into the disk drive device, the optical disk 90 is loaded on a turntable not shown in the figure, and rotation-driven at a constant linear velocity (CLV) by a spindle motor 2 at the time of recording/reproducing operation.

At the time of reproduction, an optical pickup (optical head) 1 reads mark information recorded in the track on the optical disk 90.

At the time of the recording of data onto the optical disk 90, the optical pickup 1 records user data as phase change marks or dye change marks in the track on the optical disk 90.

Incidentally, for example physical information on the disk and the like are recorded by embossed pits or a wobbling groove as reproduction-only managing information in the inner circumference area 91 of the optical disk 90 or the like. These pieces of information are also read by the optical pickup 1.

Further, on the optical disk 90, the optical pickup 1 reads the ADIP information embedded as the wobbling of the groove track on the optical disk 90.

Formed within the optical pickup 1 are a laser diode serving as a laser light source, a photodetector for detecting reflected light, an objective lens as an output terminal of laser light, an optical system for irradiating a disk recording surface with the laser light via the objective lens and guiding the reflected light to the photodetector, and the like. The laser diode outputs a so-called blue laser having a wavelength of 405 nm, for example. The NA of the optical system is 0.85.

The objective lens within the optical pickup 1 is retained by a biaxial mechanism so as to be movable in a tracking direction and a focus direction.

The whole of the optical pickup 1 is made movable in the direction of the radius of the disk by a sled mechanism 3.

The laser diode in the optical pickup 1 is driven for laser light emission by a driving signal (drive current) from a laser driver 13.

Reflected light information from the optical disk 90 is detected by the photodetector, and then converted into an electric signal corresponding to an amount of received light.

The electric signal is supplied to a matrix circuit 4.

The matrix circuit 4 includes a current-to-voltage converter circuit, a matrix operation/amplifier circuit and the like so as to correspond to output current from a plurality of light receiving elements as the photodetector. The matrix circuit 4 generates necessary signals by matrix operation processing.

The matrix circuit 4 for example generates a reproduced information signal (RF signal) corresponding to reproduced data, a focus error signal and a tracking error signal for servo control, and the like.

The matrix circuit 4 further generates a push-pull signal as a signal relating to the wobbling of the groove, that is, a signal for detecting the wobbling.

The reproduced information signal output from the matrix circuit 4 is supplied to a data detection processing section 5. The focus error signal and the tracking error signal output from the matrix circuit 4 are supplied to an optical block servo circuit 11. The push-pull signal output from the matrix circuit 4 is supplied to a wobble signal processing circuit 15.

The data detection processing section 5 binarizes the reproduced information signal.

The data detection processing section 5 for example performs A/D conversion processing on the RF signal, reproduced clock generation processing by a PLL, PR (Partial Response) equalization processing, Viterbi decoding (maximum likelihood decoding), and the like, and obtains a binary data string by partial response maximum likelihood decoding processing (PRML detection system: Partial Response Maximum Likelihood detection system).

The data detection processing section 5 then supplies the binary data string as information read from the optical disk 90 to an encoding/decoding section 7 in a following stage.

The encoding/decoding section 7 demodulates reproduced data at the time of reproduction and modulates recording data at the time of recording. Specifically, the encoding/decoding section 7 performs data demodulation, deinterleaving, ECC decoding, address decoding and the like at the time of reproduction, and performs ECC encoding, interleaving, data modulation and the like at the time of recording.

At the time of reproduction, the binary data string decoded by the above-described data detection processing section 5 is supplied to the encoding/decoding section 7. The encoding/decoding section 7 subjects the above-described binary data string to demodulation processing, and thereby obtains reproduced data from the optical disk 90. Specifically, the encoding/decoding section 7 performs demodulation processing on the data subjected to RLL(1, 7)PP modulation and recorded on the optical disk 90, performs ECC decoding processing for making error correction, and thereby obtains the reproduced data from the optical disk 90.

The data decoded down to the reproduced data by the encoding/decoding section 7 is transferred to a host interface 8, and then transferred to a host device 100 on the basis of an instruction of a system controller 10. The host device 100 is for example a computer device or an AV (Audio-Visual) system device.

ADIP information is processed at the time of recording/reproduction on the optical disk 90.

Specifically, the push-pull signal output from the matrix circuit 4 as a signal relating to the wobbling of the groove is converted into digitized wobble data in a wobble signal processing circuit 6. In addition, a clock synchronized with the push-pull signal is generated by PLL processing.

The wobble data is subjected to MSK demodulation and STW demodulation by an ADIP demodulating circuit 16, and demodulated into a data stream constituting an ADIP address.

The data stream is then supplied to an address decoder 9.

The address decoder 9 decodes the data supplied thereto, thereby obtains an address value, and then supplies the address value to the system controller 10.

At the time of recording, recording data is transferred from the host device 100. The recording data is supplied to the encoding/decoding section 7 via the host interface 8.

The encoding/decoding section 7 in this case performs addition of an error correcting code (ECC encoding), interleaving, addition of a subcode and the like as recording data encoding processing. In addition, the data resulting from these pieces of processing is subjected to the modulation of the RLL(1, 7)PP system.

A write strategy section 14 converts the recording data processed by the encoding/decoding section 7 into a laser drive pulse in a state in which fine adjustment of optimum recording power for characteristics of recording layers, the spot shape of laser light, recording linear velocity and the like, adjustment of the waveform of the laser drive pulse, and the like have been made as recording compensation processing. The write strategy section 14 supplies the laser drive pulse to the laser driver 13.

The laser driver 13 then supplies the laser drive pulse resulting from the recording compensation processing to the laser diode within the optical pickup 1 to make laser light emission driving performed. Thereby marks corresponding to the recording data are formed on the optical disk 90.

Incidentally, the laser driver 13 includes a so-called APC circuit (Auto Power Control) to control laser output so as to hold the laser output constant irrespective of temperature and the like while monitoring laser output power on the basis of the output of a detector for monitoring the laser power which detector is provided within the optical pickup 1.

Target values of the laser output at the time of recording and at the time of reproduction are supplied from the system controller 10. The level of the laser output is controlled to be the target values at the time of recording and at the time of reproduction, respectively.

An optimum laser power at the time of recording is set by a laser power adjustment process to be described later.

The optical block servo circuit 11 generates various servo drive signals for focus, tracking, and a sled from the focus error signal and the tracking error signal from the matrix circuit 4 to make servo operation performed.

Specifically, the optical block servo circuit 11 generates a focus drive signal and a tracking drive signal according to the focus error signal and the tracking error signal, and drives a focus coil and a tracking coil of the biaxial mechanism within the optical pickup 1 by a biaxial driver 18. A tracking servo loop and a focus servo loop are thereby formed by the optical pickup 1, the matrix circuit 4, the optical block servo circuit 11, the biaxial driver 18, and the biaxial mechanism.

In addition, the optical block servo circuit 11 makes a track jump operation performed by turning off the tracking servo loop and outputting a jump drive signal in response to a track jump command from the system controller 10.

In addition, the optical block servo circuit 11 generates a sled drive signal on the basis of a sled error signal obtained as a low-frequency component of the tracking error signal, access execution control from the system controller 10, and the like, and drives the sled mechanism 3 by a sled driver 19. Though not shown, the sled mechanism 3 includes a main shaft for retaining the optical pickup 1, a sled motor, a transmission gear and the like. A required sliding movement of the optical pickup 1 is performed by driving the sled motor according to the sled drive signal.

A spindle servo circuit 12 performs control to make CLV rotation of the spindle motor 2.

The spindle servo circuit 12 obtains a clock generated by PLL processing on a wobble signal as present rotational speed information of the spindle motor 2, and generates a spindle error signal by comparing the present rotational speed information with predetermined CLV reference speed information.

In addition, at the time of data reproduction, a reproduced clock generated by a PLL within the data detection processing section 5 is the present rotational speed information of the spindle motor 2, and thus the spindle error signal can also be generated by comparing the present rotational speed information with the predetermined CLV reference speed information.

Then, the spindle servo circuit 12 outputs a spindle drive signal generated according to the spindle error signal to make the CLV rotation of the spindle motor 2 by a spindle driver 17.

In addition, the spindle servo circuit 12 generates a spindle drive signal according to a spindle kick/brake control signal from the system controller 10 to perform operations such as starting, stopping, accelerating, decelerating and the like of the spindle motor 2.

The various operations of the servo system and the recording and reproducing system as described above are controlled by the system controller 10 formed by a microcomputer.

The system controller 10 performs various kinds of processing according to commands supplied from the host device 100 via the host interface 8.

When a writing instruction (write command) is issued from the host device 100, for example, the system controller 10 first moves the optical pickup 1 to an address at which to perform writing. The system controller 10 then makes the encoding/decoding section 7 perform encoding processing as described above on data (for example video data, audio data and the like) transferred from the host device 100. Then, recording is performed by the laser light emission driving of the laser driver 13 according to the data encoded as described above.

In addition, when a read command requesting the transfer of certain data recorded on the optical disk 90 is supplied from the host device 100, for example, the system controller 10 first performs seek operation control with a specified address as a target. That is, the system controller 10 issues a command to the optical block servo circuit 11 to make access operation of the optical pickup 1 performed with the address specified by the seek command as a target.

The system controller 10 thereafter performs operation control necessary to transfer the data in the specified data section to the host device 100. That is, the system controller 10 reads data from the optical disk 90, makes reproduction processing performed in the data detection processing section 5 and the encoding/decoding section 7, and transfers the requested data.

Incidentally, while the example of FIG. 2 has been described as a disk drive device connected to the host device 100, the disk drive device according to an embodiment of the present invention can take a form of not being connected to another device. In this case, an operating section and a display section are provided, and the configuration of an interface part for data input and output is different from that of FIG. 2. That is, it suffices to perform recording and reproduction according to an operation of a user, and form a terminal section for inputting and outputting various kinds of data. Of course, various other examples of configuration of the disk drive device are conceivable.

3. Configuration of Optical System and Control System Therefor

Figure 3:
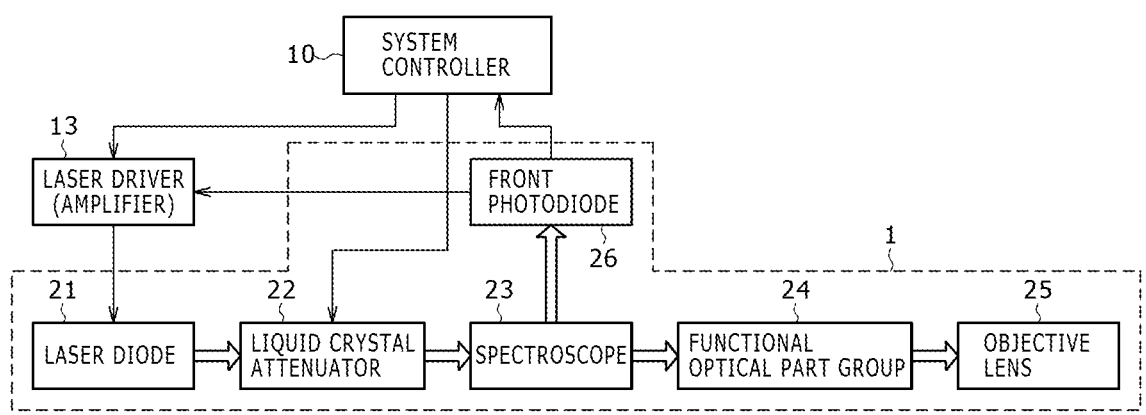
FIG. 3 is a block diagram showing an example of an internal configuration of an optical pickup in the disk drive device together with the configuration of a control system therefor.

FIG. 3 shows principal parts of the optical system in the optical pickup 1 in FIG. 2 described above together with a control system therefor.

The optical pickup 1 shown in FIG. 3 includes a laser diode 21, a liquid crystal attenuator 22, a spectroscope 23, a functional optical part group 24, and an objective lens 25.

The laser diode 21 is driven for light emission by a driving current output from the laser driver 13.

In this case, the system controller 10 indicates an appropriate laser power to the laser driver 13 as appropriate according to the time of recording/reproduction, for example. The laser driver 13 adjusts a drive signal (amount of driving current) output to a laser power diode 21 by an internal APC circuit on the basis of an output from a front photodiode (FPD) 26 to be described later. Thereby, laser light emitted from the laser diode 21 is controlled to be constant at the specified laser power.

In this case, in the optical pickup 1, the laser light emitted from the laser diode 21 reaches the spectroscope 23 via the liquid crystal attenuator 22.

The liquid crystal attenuator 22 is formed by a liquid crystal panel, for example. The liquid crystal attenuator 22 is driven so as to switch between two states, that is, an on state and an off state, for example, under control of the system controller 10.

In this case, the on (closed) state of the liquid crystal attenuator 22 refers to a state in which the liquid crystal attenuator 22 emits incident light after attenuating the incident light by a certain amount. The off (opened) state of the liquid crystal attenuator refers to a state in which the liquid crystal attenuator 22 emits incident light after transmitting the incident light as it is.

The liquid crystal attenuator 22 is, as an example, used so as to support reproduction of the single-layer optical disk and the multilayer optical disk. For example, in the case of the multilayer optical disk, consideration needs to be given to attenuation of laser light due to the passage of the light through recording layers. Thus, a laser power corresponding to recording and reproduction supporting the multilayer optical disk is generally set in a disk drive device supporting the multilayer optical disk.

On the other hand, in the case of the single-layer optical disk, consideration does not need to be given to attenuation of laser light due to the passage of the light through recording layers as described above, and therefore a lower laser power than in the case of the multilayer optical disk is suited.

However, in the disk drive device supporting the multilayer optical disk, the laser driver 13, the laser diode 21 and the like are designed so as to provide a laser power corresponding to the multilayer optical disk. In this case, when the laser power is to be attenuated to a laser power suitable for the single-layer optical disk by the laser driver 13, for example, a region of much noise needs to be used, which may lower stability of recording and reproduction.

Accordingly, for example, switching is performed so as to turn off the liquid crystal attenuator 22 when recording and reproducing the multilayer optical disk and so as to turn on the liquid crystal attenuator 22 when recording and reproducing the single-layer optical disk. Incidentally, the laser power is set at a value corresponding to the multilayer optical disk at all times regardless of whether an optical disk to be recorded or reproduced is a multilayer optical disk or a single-layer optical disk, for example.

Thus, at the time of recording and reproduction corresponding to the single-layer optical disk, laser light at the laser power corresponding to the multilayer optical disk is emitted from the laser diode 21, and the laser light is attenuated in the liquid crystal attenuator 22. That is, the laser light can be emitted from the laser diode 21 in a state free from noise, and attenuated to an intensity suitable for the single-layer optical disk by the liquid crystal attenuator 22.

Incidentally, other uses of the above-described liquid crystal attenuator 22 and driving modes according to the other uses are also conceivable.

In this case, the laser light emitted from the liquid crystal attenuator 22 enters the spectroscope 23.

The spectroscope 23 in this case divides the incident laser light into two pieces of light, emits one of the divided pieces of laser light to the functional optical part group 24, and emits the other to the front photodiode 26.

First, the front photodiode 26 receives the laser light incident thereon from the spectroscope 23, and outputs an output corresponding to the amount of the received light to the laser driver 13.

As APC, the laser driver 13 varies the drive signal (amount of driving current) output to the laser diode 21 so that the amount of the received light indicated by the detection signal input from the front photodiode 26 is a value corresponding to the laser power specified by the system controller 10.

Incidentally, in the configuration shown in FIG. 3, the output of the front photodiode 26 is also input to the system controller 10. That is, the system controller 10 can monitor the output of the front photodiode 26.

The functional optical part group 24 in this case for example represents an aberration correcting mechanism and required optical parts such as a mirror for changing an optical path collectively. In this case, the laser light passed through the functional optical part group 24 enters the objective lens 25.

Incidentally, in FIG. 3, the functional optical part group 24 is disposed between the spectroscope 23 and the objective lens 25. In practice, however, parts forming the functional optical part group 24 may be disposed in an optical path other than between the spectroscope 23 and the objective lens 25 as required, for example.

The laser light made incident on the objective lens 25 from the functional optical part group 24 is applied to a recording layer of the optical disk 90 not shown in FIG. 3 in a condensed state.

Incidentally, the optical pickup 1 also includes a main photodetector for detecting reflected light from the objective lens 25 and generating a received signal serving as a basis for a reproduced signal and various servo error signals, for example, as well as a mirror, a spectroscope and the like for guiding the reflected light from the objective lens 25 to the main photodetector. However, these part elements are not shown in FIG. 3.

4. Laser Power Correction According to Present Embodiment

4-1. Relative Transmittance

As will be described in the following, the disk drive device according to the present embodiment corrects the laser power at the time of reproduction so as to correspond to a recording state of the recording layers in the multilayer optical disk 90. The transmittance (relative transmittance) of the recording layers will first be described.

As a precondition, on the four-layer optical disk 90 corresponding to the present embodiment, recording is first performed from the recording layer L0 on the substrate side, and each time the recording is completed, recording is performed toward the surface side in order of the recording layers L1, L2, and L3 sequentially.

The light transmittance of one recording layer differs between a data-recorded state and an unrecorded state. In relative terms, supposing that light transmittance in the recorded state is 1 (100%), transmittance in the unrecorded state is a value smaller than 1 and corresponding to less than 100%. That is, supposing that the relative transmittance of one recording layer in the recorded state is 1, the relative transmittance in the unrecorded state assumes a value less than 1.

For example, relative transmittance in the unrecorded state is about 0.95 (95%), but is not the same value in each recording layer. Relative transmittance in the unrecorded state generally differs according to conditions such as materials and thickness when each layer is formed.

In addition, suppose that the laser power at the time of reproduction which laser power serves as a reference before correction is made in the present embodiment, for example, is optimized so as to correspond to a case where all the recording layers transmitting the laser light are in the recorded state.

FIGS. 4A to 4D and FIGS. 5A to 5F show relation of relative transmittance according to a recording layer set as an object of reproduction and the recording states of recording layers.

First, FIGS. 4A to 4D represent a case where the object of reproduction is the recording layer L0.

Suppose in this case that relative transmittances less than one in the unrecorded state in the recording layers L0, L1, L2, and L3 are r1, r2, r3, and r4, respectively. Incidentally, each of the recording layers L0, L1, L2, and L3 in the recorded state has a relative transmittance of one.

Figure 4A:
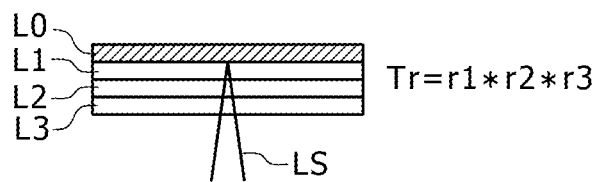
FIGS. 4A, 4B, 4C, and 4D are diagrams of assistance in explaining differences in total relative transmittance according to combinations of a reproduction object recording layer and the recording state patterns of transmitting recording layers.

FIG. 4A represents, as a case of reproducing the recording layer L0, a case where only the first recording layer L0 of the four layers in the optical disk 90 is in the data recorded state and the other recording layers L1, L2, and L3 are in the data unrecorded state. The data recorded state in this case refers to a state in which data is recorded in the recording region of the recording layer. The data unrecorded state in this case refers to a state in which data is not recorded in the recording region of the recording layer. Incidentally, a distinction between the data recorded state and the data unrecorded state in FIGS. 4A to 4D is in accordance with a legend on the lower side of a paper surface in the same figures. This legend is also applied to FIGS. 5A to 5F, FIGS. 8A to 8E, FIGS. 11A to 11C, and FIGS. 12A to 12E.

Figure 4B:
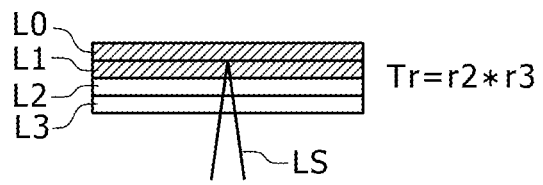

FIG. 4B represents, as a case of reproducing the same recording layer L0, a case where the first recording layer L0 and the next recording layer L1 are in the data recorded state and the other recording layers L2 and L3 are in the data unrecorded state.

Figure 4C:
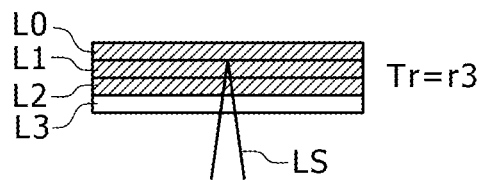

FIG. 4C represents, as a case of reproducing the recording layer L0, a case where three layers from the first recording layer L0 to the recording layer L2 are in the data recorded state and only the other recording layer L3 is in the data unrecorded state.

Figure 4D:
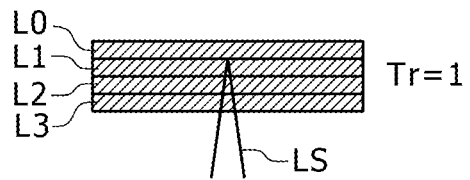

FIG. 4D represents, as a case of reproducing the recording layer L0, a case where all the recording layers from the recording layer L0 to the recording layer L4 are in the data recorded state.

When the recording layer L0 is thus reproduced, laser light LS passes through the recording layers L1, L2, and L3, and reaches the recording layer L0. Incidentally, recording layers transmitting laser light with which a reproduction object recording layer is irradiated, such as the recording layers L1, L2, and L3 in this case, will be referred to as transmitting recording layers.

First, when all of the recording layers L1, L2, and L3 as transmitting recording layers are in the data recorded state as in FIG. 4D, the relative transmittance of each of the recording layers L1, L2, and L3 is one. Thus, supposing that a total relative transmittance corresponding to the laser light LS for reproducing the recording layer L0 in this case is Tr, Tr=1 (=1*1*1).

Next, when only the recording layer L3 is in the data unrecorded state as in FIG. 4C, the recording layers L1 and L2 have a relative transmittance of one, whereas the recording layer L3 has a predetermined value less than one according to the relative transmittance r3. Thus, in this case, the total relative transmittance Tr=r3 (=1*1*r3).

Next, when the recording layers L3 and L2 are in the data unrecorded state as in FIG. 4B, the recording layer L1 has a relative transmittance of one, whereas the relative transmittances of the recording layers L2 and L3 assume values less than one as r2 and r3, respectively. Thus, in this case, the total relative transmittance Tr=r2*r3.

Further, when the recording layers L1, L2, and L3 are all in the data unrecorded state as in FIG. 4A, the recording layers L1, L2, and L3 assume values less than one as the relative transmittances r1, r2, and r3, respectively. Thus, in this case, the total relative transmittance Tr=r1*r2*r3.

For example, as a simplest concrete example, suppose that the relative transmittances r1, r2, and r3 of the respective recording layers L1, L2, and L3 in the unrecorded state are each 0.95.

Then, the total relative transmittance Tr=0.95 in correspondence with FIG. 4C, the total relative transmittance Tr=0.90 (=0.95*0.95) in correspondence with FIG. 4B, and the total relative transmittance Tr=0.86 (=0.95*0.95*0.95) in correspondence with FIG. 4A.

Figure 5A:
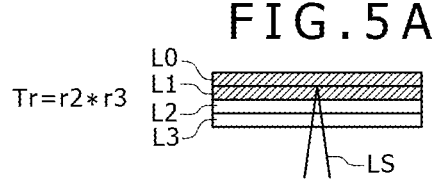
FIGS. 5A, 5B, 5C, 5D, 5E, and 5F are diagrams of assistance in explaining differences in total relative transmittance according to combinations of a reproduction object recording layer and the recording state patterns of transmitting recording layers.
Figure 5B:
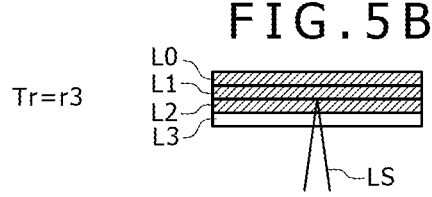
Figure 5D:
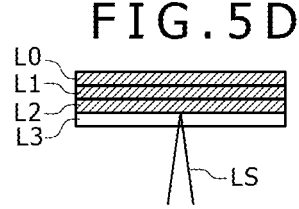
Figure 5C:
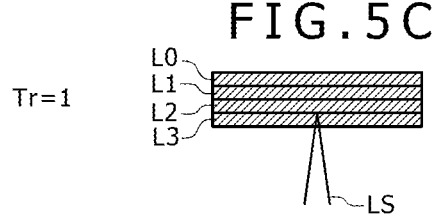

FIGS. 5A, 5B, and 5C show the total relative transmittance according to the recording states of transmitting recording layers when the recording layer L1 is reproduced. When the recording layer L1 can be reproduced in the present embodiment, it means that at least the recording layers L0 and L1 are in the data recorded state.

First, there are two transmitting recording layers when the recording layer L1 is reproduced, that is, the recording layers L2 and L3.

Accordingly, first, there is a case in which the recording states of the recording layers L2 and L3 are both the data unrecorded state according to a fact that up to the recording layers L0 and L1 are in the data recorded state, as shown in FIG. 5A. In this case, the total relative transmittance Tr=r2*r3.

In addition, as shown in FIG. 5B, according to a fact that up to the recording layers L0, L1, and L2 are in the data recorded state, there is a case in which the recording layer L2 is in the data recorded state, whereas the recording layer L3 is in the unrecorded state. In this case, the total relative transmittance Tr=r3.

As shown in FIG. 5C, according to a fact that all the recording layers L0 to L3 are in the data recorded state, there is a case in which the recording layers L2 and L3 are both in the data recorded state. In this case, the total relative transmittance Tr=1.

Figure 5E:
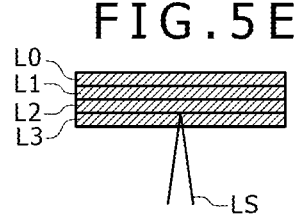

FIGS. 5D and 5E correspond to a case of reproducing the recording layer L2. In order that the recording layer L2 can be reproduced, at least the recording layers L0 to L2 are in the data recorded state.

The only transmitting recording layer in the reproduction of the recording layer L2 is the recording layer L3. Thus, the transmitting recording layer has two recording states as in a case of FIG. 5D in which the recording layer L3 is in the data unrecorded state and a case of FIG. 5E in which the recording layer L3 is in the data recorded state.

The total relative transmittance Tr=r3 in the case of FIG. 5D. The total relative transmittance Tr=1 in the case of FIG. 5E.

Figure 5F:
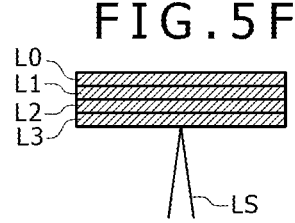

FIG. 5F corresponds to a case of reproducing the recording layer L3. In order that the recording layer L3 can be reproduced, all the recording layers L0 to L3 are in the data recorded state.

There is no transmitting recording layer in this case because the recording layer L3 is the recording layer on the outermost surface side. Thus, also in this case, the total relative transmittance Tr=1.

As shown in FIGS. 4A to 4D and FIGS. 5A to 5F described above, even when a same recording layer is reproduced, the total relative transmittance differs according to whether the recording states of transmitting recording layers at the time of the reproduction are the data recorded state or the data unrecorded state. When the value of the total relative transmittance Tr changes, the light quantity and energy of the laser light after passing through the transmitting recording layers also change, of course. That is, the difference in the total relative transmittance Tr described above means that even when a same recording layer is reproduced, the intensity of the laser light differs according to the recording states of transmitting recording layers at the time of the reproduction.

For example, as described above, in an optical disk of about two layers, each layer is allowed to be reproduced with a same laser power by a method of defining a range of specifications for the recording layers, for example, even when the relative transmittance changes according to the recording state of the transmitting recording layer as described above. However, an optical disk of three layers or more may have a larger difference in total relative transmittance than in the case of two layers. It is thus considered that good reproduction cannot be expected with the above-described method in some cases.

4-2. Laser Power Correction

First Example

Accordingly, the present embodiment corrects laser power at the time of reproduction as described in the following so as to correspond to changes in total relative transmittance as illustrated in FIGS. 4A to 4D and FIGS. 5A to 5F.

A first to a third example will be cited as laser power correction according to the present embodiment. Description will be started with the first example.

First, in the first example, the system controller of the disk drive device retains a correction coefficient table 10a based on the relative transmittance described with reference to FIGS. 4A to 4D and FIGS. 5A to 5F.

FIG. 6 schematically shows an example of contents of the correction coefficient table 10a.

The correction coefficient table 10a shown in FIG. 6 has a structure that stores correction coefficient values for laser power in association with combinations of reproduction object recording layers and recorded/unrecorded state patterns (layer state patterns) of each recording layer. Incidentally, as described on a lower left side of a paper surface in FIG. 6, the notation of the layer state patterns in the figure indicates a layer in the recorded state on a left side of/in [/] and indicates a layer in the unrecorded state on a right side of/in [/].

For example, in the correction coefficient table 10a, cases in which the reproduction object recording layer is the recording layer L0 correspond to FIGS. 4A to 4D.

According to FIG. 4A, when the recording layer L0 is reproduced, and when only the recording layer L0 is in the recorded state, the total relative transmittance Tr=r1*r2*r3.

In the correction coefficient table 10a of FIG. 6, a correction coefficient in the case in which the reproduction object recording layer is the recording layer L0 and only the recording layer L0 is in the data recorded state, which case corresponds to FIG. 4A, is 1/(r1*r2*r3).

That is, a correction coefficient according to the present embodiment is obtained as a reciprocal of the total relative transmittance Tr obtained so as to correspond to a combination of a same reproduction object recording layer and a same layer state pattern.

Incidentally, other correction coefficients than that described above in FIG. 6 are each a reciprocal of the total relative transmittance Tr obtained so as to correspond to FIGS. 4B, 4C, and 4D and FIGS. 5A to 5F.

Figure 7:
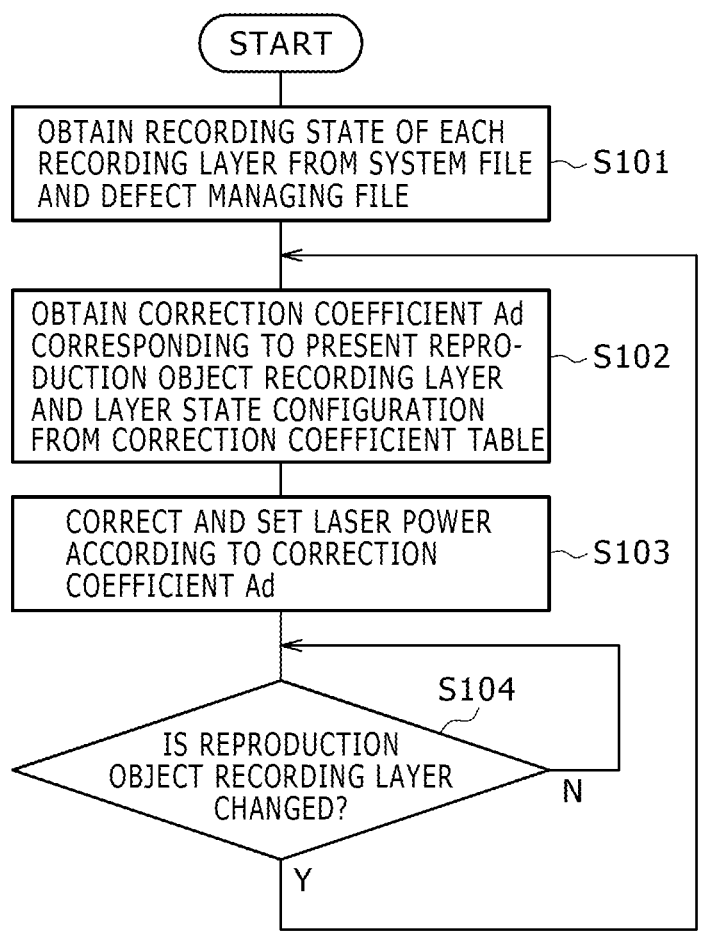
FIG. 7 is a flowchart of an example of a process procedure for laser power correction corresponding to the first example of the embodiment.

A flowchart of FIG. 7 shows an example of a process procedure for laser power correction as the first example. Incidentally, the process shown in FIG. 7 can be regarded as a process performed by the system controller 10 of the disk drive device according to the present embodiment according to a program, for example.

As a precondition, in the process shown in FIG. 7, step S101 is performed in response to a start of reproduction of the optical disk 90, and thereafter steps S102 to S104 are repeated until reproduction is stopped.

In addition, suppose that the system controller indicates a laser power set in advance as a reference (default) in correspondence with the four-layer optical disk 90, for example, to the laser driver 13 at the time of a start of reproduction of the optical disk 90.

In this case, the system controller 10 retains the data of a system file and defect managing information read from the optical disk 90 now loaded for reproduction. The system file for example corresponds to the managing information of a file system and indicates the addresses of data recorded on the optical disk 90. The defect managing information represents information on addresses of a defect region, a replacement region and the like detected in each recording layer of the optical disk 90.

For example, in response to a start of reproduction, the system controller 10 in step S101 obtains information on the recording state of each recording layer by referring to the contents of the system file and the defect managing information described above.

Incidentally, the recording state obtained in step S101 is at least information indicating up to which recording layers of the four recording layers L0 to L3 are in the data recorded state.

Then, the system controller 10 in step S102 first determines a present reproduction object recording layer and a present layer state pattern. For the present reproduction object recording layer, it suffices to determine which recording layer has an address reproduced at that time. The layer state pattern can be obtained from the information on the recording state of each recording layer which information is obtained in step S101.

Then, the system controller 10 reads a correction coefficient value stored in correspondence with the determined present reproduction object recording layer and the determined present layer state pattern from the correction coefficient table 10a. The correction coefficient value is set as correction coefficient Ad. The correction coefficient Ad is treated as an effective value used to actually correct the laser power in laser power control, and is a correction value for the reference value of the laser power set in correspondence with the time of reproduction.

Then, in step S103, a laser power value corrected by the above-described correction coefficient Ad is calculated. As a simplest example, letting ref be the reference value of the laser power, the corrected laser power value can be obtained by ref*Ad. Then, the corrected laser power value is indicated to the laser driver 13. The laser driver 13 thereby performs control so as to attain the indicated laser power, so that laser power correction is performed properly.

Next, as the reproduction progresses, the system controller 10 waits for the reproduction object recording layer to be changed. Then, when determining that the reproduction object recording layer is changed, the system controller 10 returns to step S102 to perform laser power correction by a correction coefficient Ad obtained in correspondence with a reproduction object recording layer and a layer state pattern after the change.

By such a process, the present embodiment can perform proper laser power correction according to a reproduction object recording layer and a recording layer configuration (that is, the recorded/unrecorded state of each transmitting recording layer) at that time.

4-3. Laser Power Correction

Second Example

In actuality, there is a case in which a region in the recorded state and a region in the unrecorded state are mixed with each other in the recordable region (data zone 92) of even a recording layer treated as being in the data recorded state because data is already recorded in the recording layer.

A state in which recording has been performed only halfway in the recordable region of a recording layer recorded last up to a present time, for example, can be cited as such a case. Suppose, for example, that after the entire recordable region of the recording layer L0 is recorded, recording of the next recording layer L1 is started, but the recording is stopped halfway in the recordable region of the recording layer L1. In this case, a region in the recorded state and a region in the unrecorded state are mixed with each other in the recording layer L1.

In addition, a region in the recorded state and a region in the unrecorded state are mixed with each other in one recording layer also in a case where the recording layer has a region that is registered as a defect area and in which region data is thus not recorded.

Then, for example, even in transmitting recording layers treated as being in the recorded state in FIGS. 4A to 4D and FIGS. 5A to 5F, regions through which laser light LS passes can actually be not only in the recorded state but also in the unrecorded state. When a region is in the unrecorded state, the relative transmittance corresponding to the recording layer changes to be less than one, and therefore the total relative transmittance also changes. Thus, an optimum correction value is to be changed as well.

The second example of the present embodiment is configured so as to be able to perform laser power correction by appropriately changing the correction value even in a case where a region part in the recorded state and a region part in the unrecorded state are thus mixed with each other in a transmitting recording layer in the data recorded state.

First, the second example needs to assume cases in which patterns (layer state patterns) of the recording state of each recording layer as shown in FIGS. 8A to 8E are formed in addition to cases shown in FIGS. 4A, 4B, 4C, and 4D so as to correspond to times when a region part through which laser light LS passes in a transmitting recording layer in the data recorded state is in the unrecorded state.

Figure 8A:
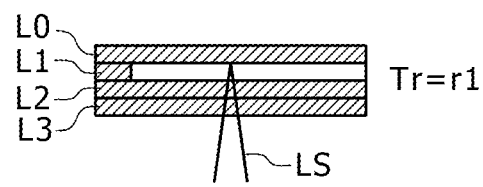
FIGS. 8A, 8B, 8C, 8D, and 8E are diagrams of assistance in explaining differences in total relative transmittance according to combinations of a reproduction object recording layer and the recording state patterns of transmitting recording layers added so as to correspond to a second example of the embodiment.

First, FIG. 8A represents a case in which all the recording layers L0 to L3 are in the data recorded state and the recording layer L1 has an unrecorded region part when the recording layer L0 is reproduced. A layer state pattern in this case is such that the recording layers L0, L2, and L3 are in the recorded state and the recording layer L1 is in the unrecorded state.

Figure 8B:
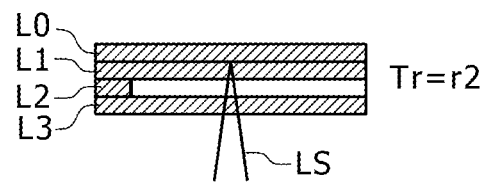

FIG. 8B represents a case in which the four recording layers L0 to L3 are similarly in the data recorded state and the recording layer L2 has an unrecorded region part when the recording layer L0 is reproduced. A layer state pattern in this case is such that the recording layers L0, L1, and L3 are in the recorded state and the recording layer L2 is in the unrecorded state.

Figure 8C:
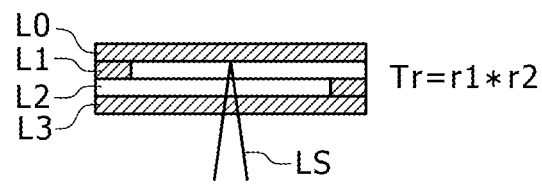

FIG. 8C represents a case in which all the recording layers L0 to L3 are in the data recorded state and two layers, that is, the recording layers L1 and L2 have an unrecorded region part when the recording layer L0 is reproduced. A layer state pattern in this case is such that the recording layers L0 and L3 are in the recorded state and the recording layers L1 and L2 are in the unrecorded state.

Figure 8D:
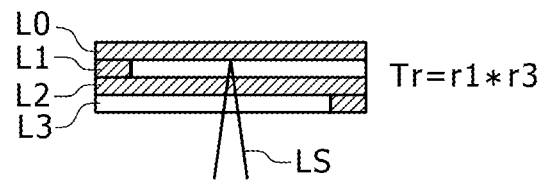

FIG. 8D represents a case in which all the recording layers L0 to L3 are in the data recorded state and two layers, that is, the recording layers L1 and L3 have an unrecorded region part when the recording layer L0 is reproduced. A layer state pattern in this case is such that the recording layers L0 and L2 are in the recorded state and the recording layers L1 and L3 are in the unrecorded state.

Figure 8E:
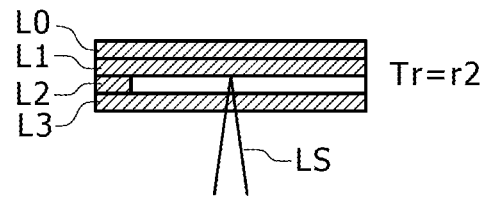

A layer state pattern in FIG. 8E is similar to that of FIG. 8B, but represents a case in which the reproduction object recording layer is the recording layer L1 rather than the recording layer L0.

As for the total relative transmittance Tr, as shown in FIGS. 8A to 8E, Tr=r1 in the case of FIG. 8A, Tr=r2 in the case of FIG. 8B, the total relative transmittance Tr=r1*r2 in the case of FIG. 8C, the total relative transmittance Tr=r1*r3 in the case of FIG. 8D, and the total relative transmittance Tr=r2 in the case of FIG. 8E.

The total relative transmittance shown in each of FIGS. 8A, 8B, 8C, 8D, and 8E is not supposed in the first example in which consideration is not given to the presence of unrecorded region parts in the data recorded state. However, when these recording state patterns appear, the second example performs laser power correction so as to correspond to the recording state patterns.

For this, the correction coefficient table 10a in the second example retains contents as shown in FIG. 9.

Correction coefficients stored so as to correspond to first layer state patterns in an upper division in the correction coefficient table 10a of FIG. 9 are the same as in FIG. 6.

In the correction coefficient table 10a corresponding to the second example, correction coefficients are further stored in association with second layer state patterns as shown in a lower division of the correction coefficient table 10a.

The pattern [L0, L1, L3/L2] of the second layer state patterns corresponds to each of FIGS. 8B and 8E in which only the recording layer L2 is in the unrecorded state in FIGS. 8A to 8E. Because the total relative transmittance Tr=r2 in FIGS. 8B and 8E, in correspondence therewith, 1/r2 (reciprocal of r2) is stored as a correction coefficient in both cases of the reproduction object recording layer being the recording layer L0 or L1 so as to correspond to the pattern [L0, L1, L3].

The pattern [L0, L2, L3] in a second row, the pattern [L0, L2] in a third row, and the pattern [L0, L3] in a fourth row of the second layer state patterns correspond to FIG. 8A, FIG. 8D, and FIG. 8C, respectively. In correspondence with these patterns, 1/r1 is stored as a correction coefficient for the pattern [L0, L2, L3] in the second row in the column of the reproduction object recording layer L0. In addition, 1/(r1*r3) is stored for the pattern [L0, L2] in the third row, and 1/(r1*r2) is stored for the pattern [L0, L3] in the fourth row.

Incidentally, depending on the manner of appearance of unrecorded region parts, layer state patterns similar to those of FIGS. 4A, 4B, and 4C, FIGS. 5A, 5B, and 5D and the like can occur. In this case, laser power correction is performed using a correction coefficient value stored in correspondence with a recorded layer configuration on a normal side corresponding to a determined layer state pattern and a reproduction object recording layer.

Figure 10:
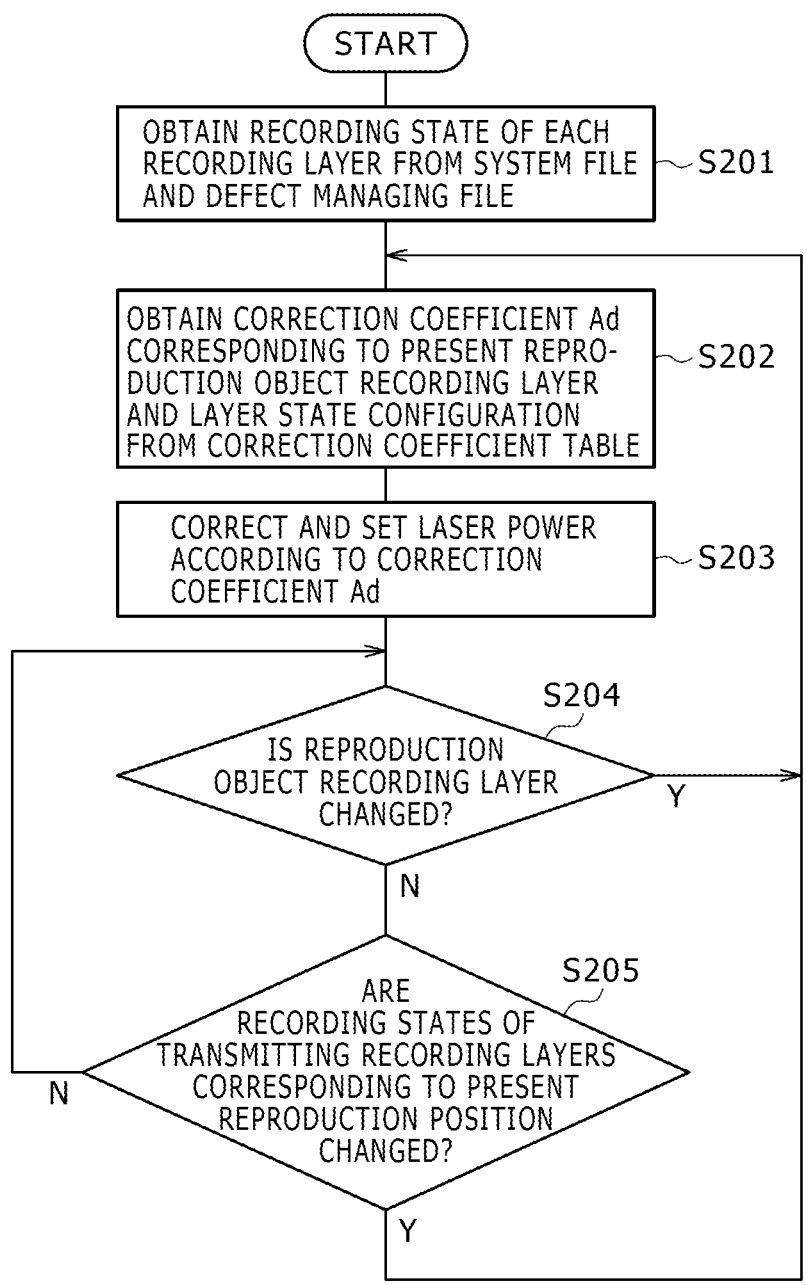
FIG. 10 is a flowchart of an example of a process procedure for laser power correction corresponding to the second example of the embodiment.

A flowchart of FIG. 10 shows an example of a process procedure for laser power correction performed by the disk drive device (system controller 10) in correspondence with the second example.

Steps S201 to S203 in FIG. 10 are similar to steps S101 to S103 in FIG. 7.

In step S201, however, the address of a recorded region part and the address of an unrecorded region part are obtained so as to identify the recorded region part and the unrecorded region part in distinction from each other as the recording state of each recording layer.

Then, in step S202, on the basis of the recording state information obtained in step S201 described above, whether a region through which laser light LS passes is a recorded region part or an unrecorded region part in each transmitting recording layer in the data recorded state is reflected in recognizing a present layer state pattern.

For example, when the recording layers L0 to L3 are originally recorded as shown in FIG. 4D, and an unrecorded region part appears in the recording layer L1 as shown in FIG. 8A, this is reflected to recognize the pattern [L0, L2, L3] as a layer state pattern.

Then, the system controller 10 reads a correction coefficient value stored in correspondence with a reproduction object recording layer and the layer state pattern recognized as described above from the correction coefficient table 11a of FIG. 11, and obtains the correction coefficient value as a normal correction coefficient Ad for control. Next, in step S203, laser power correction is performed by the correction coefficient Ad.

After the laser power correction in step S203, whether the reproduction object recording layer is changed is determined in step S204 as in step S101 in FIG. 7. When it is determined that the reproduction object recording layer is changed, a return is made to step S202.

When a negative determination result indicating that the reproduction object recording layer is not changed is obtained in step S204, whether the recording state of each transmitting recording layer which recording state corresponds to a present reproduction position is changed is further determined in step S205.

A positive determination result is obtained when it is recognized that for example at least one transmitting recording layer has changed from a recorded region part to an unrecorded region part, or conversely has changed from an unrecorded region part to a recorded region part as the recording state of each transmitting recording layer in this case.

A return is made to step S204 when a negative determination result is obtained in step S205. A return is made to step S202 when a positive determination result is obtained in step S205.

Suppose as a concrete example that an unrecorded region part appears in the recording layer L1 and the layer state pattern described with reference to FIG. 8A is obtained while the recording layer L0 is reproduced. In response to this, a positive determination result is obtained in step S205, and thus a return is made to step S202. Then, the system controller 10 in step S202 reads 1/r1 as the correction coefficient value stored in correspondence with the combination of the pattern [L0, L2, L3] of the second layer state patterns and the reproduction object recording layer L0 in the correction coefficient table 10a. Then, in step S203, a laser power value corrected by the correction coefficient Ad=1/r1 is indicated to the laser driver 13.

For example, the first example has an algorithm fixed at a laser power corrected so as to correspond to the time of a start of reproduction of a recording layer when the recording layer is reproduced.

On the other hand, with the control according to the above-described second example, even in the middle of reproduction of one recording layer, when a change occurs between a recorded region part and an unrecorded region part in a transmitting recording layer, correction is performed so as to change to an appropriate laser power according to the change.

4-4. Laser Power Correction

Third Example

A third example of laser power correction will next be described. In the third example, an algorithm for laser power correction when laser light passes in the vicinity of a boundary between a recorded region part and an unrecorded region part in one transmitting recording layer is added to the configuration of the second example.

Figure 11A:
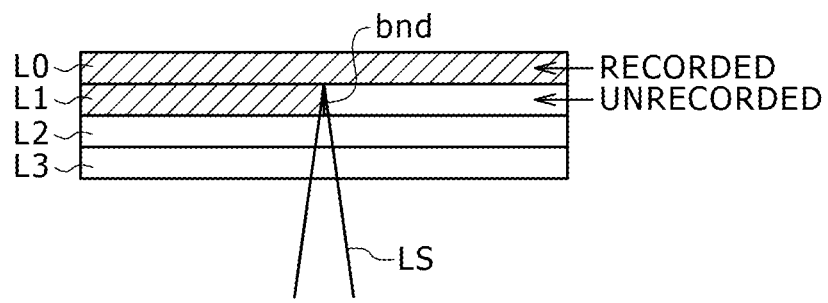
FIGS. 11A, 11B, and 11C are diagrams showing relation between a recorded region part/unrecorded region part of an actual transmitting recording layer and laser light in the vicinity of a boundary between the recorded region part and the unrecorded region part of the transmitting recording layer, FIGS. 11A, 11B, and 11C corresponding to the third example of the embodiment.

Consideration will now be given to a case where reproduction is performed with the recording layer L0 as a reproduction object, and a recorded region part and an unrecorded region part are mixed with each other in the recording layer L1, as shown in FIG. 11A, for example. Then, as shown in FIG. 11A, it can of course be considered that laser light LS passes a boundary bnd between a recorded region part and an unrecorded region part in the recording layer L1. This means that when there is a transmitting recording layer in the data recorded state, there is a possibility that a boundary between a recorded region part and an unrecorded region part in the transmitting recording layer passes, or a region in the vicinity of the boundary passes, at a position of irradiation with the laser light LS during reproduction.

According to the second example, to deal with such a state, it is determined in step S205 that a change from a recorded region part to an unrecorded region part has occurred, or that a change from an unrecorded region part to a recorded region part has occurred, and a return is made to step S202.

The system controller 10 grasps correspondences between the addresses of a physically identical disk position between recording layers on the basis of the system file or the like. That is, the addresses of transmitting recording layers at a physically identical position with the address of a reproduction position in a present reproduction object recording layer can be recognized.

Thus, the determination of a change between a recorded region part and an unrecorded region part in step S205 can be made by determining which of the recorded region part and the unrecorded region part corresponds to the address of the transmitting recording layer at a physically identical disk position with a present reproduction address from the recording information obtained in step S201.

In actuality, however, an error can occur in a result of determination of a recorded region part or an unrecorded region part in the vicinity of a boundary between the recorded region part and the unrecorded region part of the transmitting recording layer, as will be described in the following.

For example, a multilayer optical disk 90 actually manufactured has eccentricity in recording layers, and the degree and state of the eccentricity differ in each recording layer. Thus, an error is highly likely to occur between a result of determination of an address on the basis of the system file or the like by the system controller 10 and an actual address at a same disk position in each recording layer.

This means that in the vicinity of a boundary between a recorded region part and an unrecorded region part, the system controller 10 may erroneously recognize an actually recorded region part as an unrecorded region part or may conversely recognize erroneously an actually unrecorded region part as a recorded region part.

For example, when this erroneous recognition occurs in the second example, the correction coefficient Ad obtained from the correction coefficient table 10a in step S202 corresponds to a layer state pattern different from an actual layer state pattern. That is, a laser power correction not corresponding to the actual layer state pattern is performed.

For example, it is considered that in actuality, a reasonably good result can be obtained by laser power correction in the second example. However, with an objective of obtaining better reproduction performance, it is desirable to perform as appropriate a laser power correction as possible in a situation where a recorded region part or an unrecorded region part can be erroneously recognized as described above.

Accordingly, in the third example, a correction coefficient is set as follows so as to correspond to the vicinity of a boundary between a recorded region part and an unrecorded region part of a transmitting recording layer.

For example, suppose that as shown in FIG. 11A, the system controller 10 recognizes that laser light LS is passing the vicinity of a boundary bnd in the recording layer L1. Incidentally, suppose that the recording layers L2 and L3 are in the unrecorded state in FIGS. 11A to 11C. Then, in actuality, there are two possibilities of a state of the laser light LS passing a recorded region part of the recording layer L1 as shown in FIG. 11B and a state of the laser light LS passing an unrecorded region part of the recording layer L1 as shown in FIG. 11C.

Figure 11B:
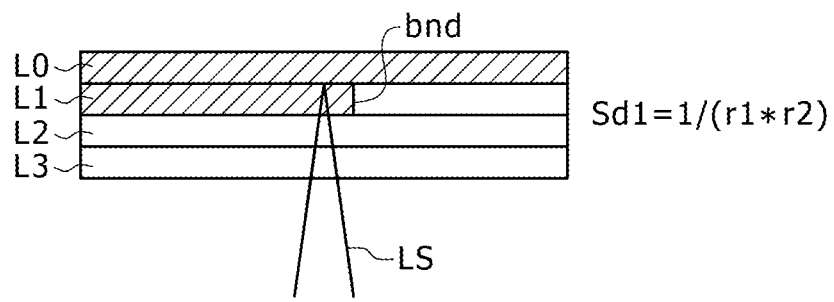

A layer state pattern shown in FIG. 11B can be considered to be a layer state pattern in which the recording layer L1 of the transmitting recording layers is recorded and the recording layers L2 and L3 are in the unrecorded state. A correction coefficient in this case is $1/(r2*r3)$ according to the correction coefficient table 10a.

Figure 11C:
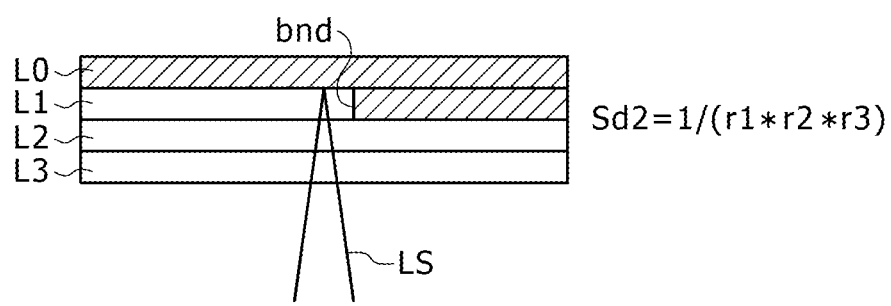

In a layer state pattern shown in FIG. 11C, the recording layers L1, L2, and L3 of the transmitting recording layers are in the unrecorded state. A correction coefficient in this case is $1/(r1*r2*r3)$. That is, there are two correction coefficients as well.

Accordingly, in setting a correction coefficient in the third example, an average value avr of the correction coefficient (correction coefficient term Sdn) of each possible layer state pattern is obtained, and the average value avr is set as a correction coefficient Ad for actual laser power correction control.

An equation for obtaining the average value avr as the correction coefficient Ad in this case can be for example expressed as $$avr=(Sd1+Sd2+\ldots+Sdn)/n$$

In the example of FIGS. 11A to 11C described above, the average value avr is obtained as $$avr=((1/r2*r3)+1/(r1*r2*r3))/2$$

The correction coefficient Ad as the average value avr is a mean value of the two correction coefficients corresponding to FIG. 11B and FIG. 11C. Thus, even when a result of determination of a recorded region part/unrecorded region part is opposite to an actual region part, for example, laser power correction is performed by a correction coefficient of a closer value than a correction coefficient in the case of the wrong determination. Thereby, a good reproduction state is more likely to be obtained than in a case of not using the correction coefficient based on the average value. As a result, reproduction performance can be improved.

When three or more recording layers are in the data recorded state, there is a case where laser light passes the vicinities of boundaries between recorded region parts and unrecorded region parts simultaneously in two or more transmitting recording layers.

An example of such a case is shown in FIGS. 12A to 12E.

Figure 12A:
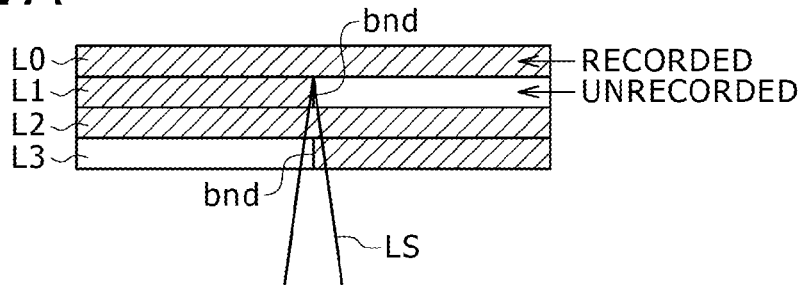
FIGS. 12A, 12B, 12C, 12D, and 12E are diagrams showing relation between recorded region part/unrecorded region parts of actual transmitting recording layers and laser light in the vicinities of boundaries between the recorded region parts and the unrecorded region parts of the transmitting recording layers, FIGS. 12A, 12B, 12C, 12D, and 12E corresponding to the third example of the embodiment.

FIG. 12A illustrates an example in which the recording layers L0 to L3 are in the data recorded state and the laser light is in the vicinities of boundaries bnd in the recording layers L1 and L3 simultaneously when the recording layer L0 is the reproduction object recording layer.

In this case, there are four possibilities of FIGS. 12B, 12C, 12D, and 12E as the layer state patterns of actual transmitting layers.

Figure 12B:
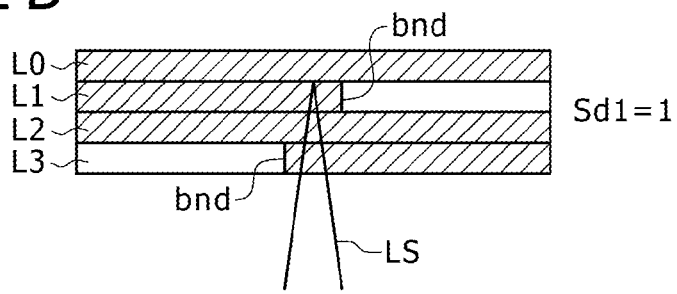

FIG. 12B represents a case where the recording layers L1 and L3 are both regarded as a recorded region part and thus the recording layers L1 to L3 as transmitting recording layers are all in the recorded state. Accordingly, the correction coefficient (correction coefficient term Sd1) obtained from the correction coefficient table 10a of FIG. 9 is Sd1=1.

Figure 12C:
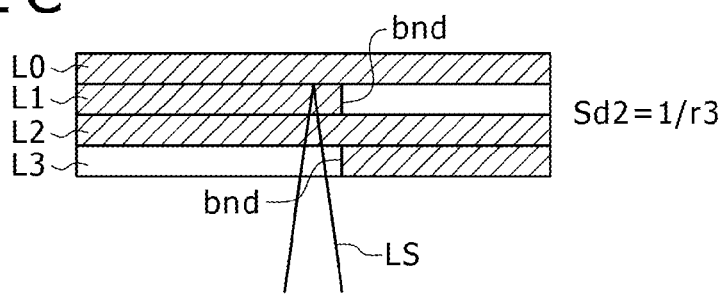

FIG. 12C represents a case where the recording layer L1 is regarded as a recorded region part, whereas the recording layer L3 is regarded as an unrecorded region part, and thus the recording layers L1 and L2 of the transmitting recording layers are in the recorded state and the recording layer L3 is in the unrecorded state. At this time, the correction coefficient term Sd2=1/r3.

Figure 12D:
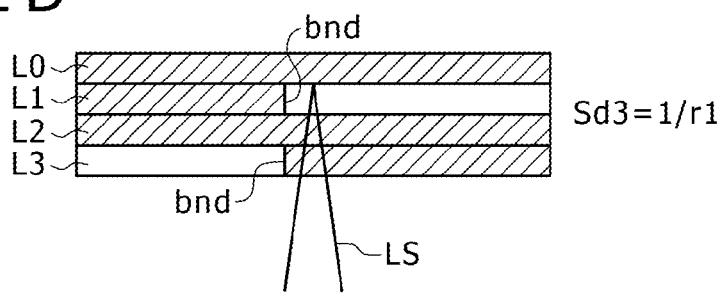

FIG. 12D represents a case where the recording layer L1 is regarded as an unrecorded region part, whereas the recording layer L3 is regarded as a recorded region part, and thus the recording layers L2 and L3 of the transmitting recording layers are in the recorded state and the recording layer L1 is in the unrecorded state. At this time, the correction coefficient term Sd3=1/r1.

Figure 12E:
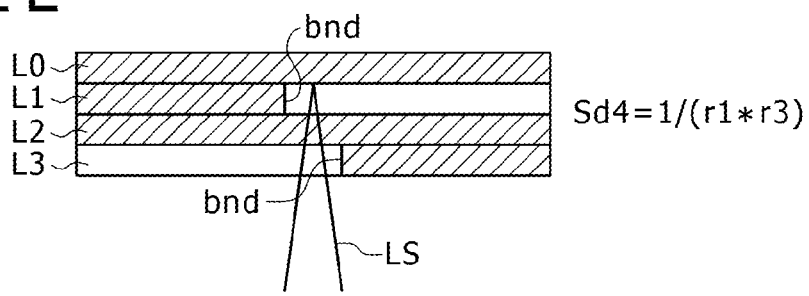

FIG. 12E represents a case where the recording layers L1 and L3 are both regarded as an unrecorded region part and thus only the recording layer L2 of the transmitting recording layers is in the recorded state and the recording layers L1 and L3 are in the unrecorded state. At this time, the correction coefficient term Sd4=1/(r1*r3).

Then, in this case, a correction coefficient Ad is obtained by calculating an average value avr of the four correction coefficient terms Sd1 to Sd4 obtained according to the four layer state patterns of FIGS. 12B, 12C, 12D, and 12E.

That is, as is understood from FIGS. 11A to 11C and FIGS. 12A to 12E, relation between transmitting recording layers judged to be the vicinity of a boundary between a recorded region part and an unrecorded region part and a reproduction object recording layer determines n possible layer state patterns of the transmitting recording layers.

Accordingly, in the third example, correction coefficients obtained for each of the n possible layer state patterns of the transmitting recording layers are set as correction coefficient terms Sd1 to Sdn, an average value of the correction coefficient terms Sd1 to Sdn is obtained, and the average value is set as correction coefficient Ad. By thus obtaining the correction coefficient terms Sd1 to Sdn, a correction coefficient as average value is obtained appropriately according to every possible pattern of appearance of boundaries between recorded region parts and unrecorded region parts.

Figure 13:
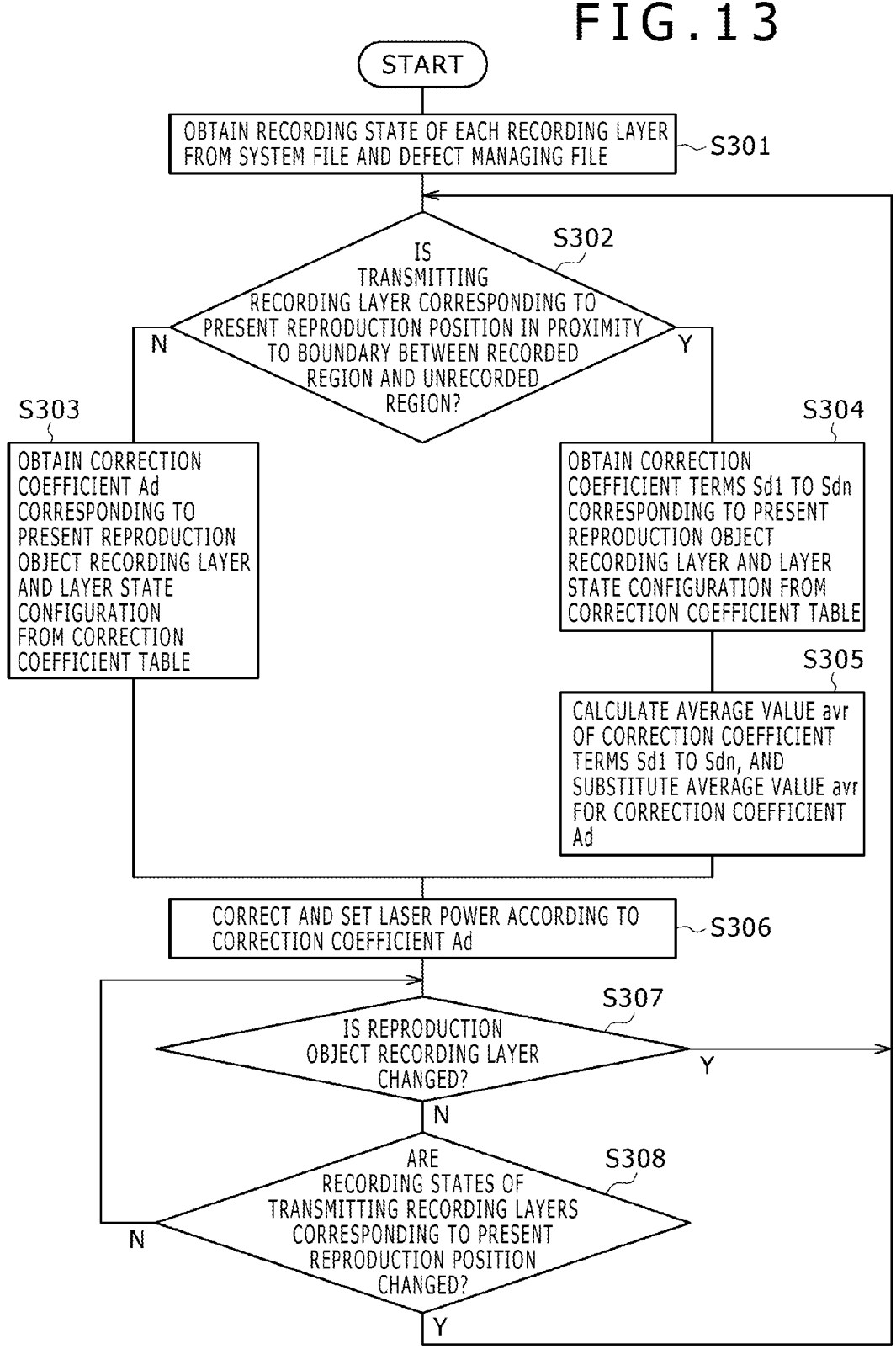
FIG. 13 is a flowchart of an example of a process procedure for laser power correction corresponding to the third example of the embodiment.

A flowchart of FIG. 13 shows an example of a process procedure for laser power correction performed by the disk drive device (system controller 10) in correspondence with the third example.

In FIG. 13, first, in step S301, as in step S201 in FIG. 10 described earlier, the addresses of a recorded region part and an unrecorded region part, for example, are obtained as the recording state of each recording layer.

In step S302, whether an address of a transmitting recording layer which address corresponds to a present reproduction position is within a region regarded as the vicinity of a boundary between a recorded region part and an unrecorded region part is determined.

In the determination in this case, first, the address of the boundary between the recorded region part and the unrecorded region part, which address is obtained from the system file, is set as a reference. Then, a margin obtained by considering an amount of displacement between physical recording layers according to eccentricity is given to the reference address. A positive determination result is obtained in step S302 when the address of the transmitting recording layer which address corresponds to the present reproduction position is included in the range of the margin.

When a negative determination result is obtained in step S302, the address of the transmitting recording layer which address corresponds to the present reproduction position is distant from the address of the boundary to such a degree that the address of the transmitting recording layer which address corresponds to the present reproduction position is certainly that of the recorded region part or the unrecorded region part even if affected by eccentricity.

In this case, a correction coefficient Ad is obtained in step S303. The process of step S303 is similar to that of step S202 in FIG. 10. That is, a correction coefficient obtained from the correction coefficient table is set as the correction coefficient Ad as it is.

When a positive determination result is obtained in step S302, on the other hand, a correction coefficient Ad is obtained by performing the processes of steps S304 and S305.

In step S304, as described with reference to FIGS. 11A to 11C and FIGS. 12A to 12E, correction coefficient terms Sd1 to Sdn corresponding to the n possible layer state patterns of the transmitting recording layers, the appearance of which patterns is possible according to a present reproduction object recording layer, are obtained from the correction coefficient table 10a in FIG. 9.

In step S305, an average value avr of the obtained correction coefficient terms Sd1 to Sdn is obtained, and the average value avr is substituted for the correction coefficient Ad.

Then, in step S306, a corrected laser power value is obtained by the correction coefficient Ad obtained in step S303 or the correction coefficient Ad obtained as average value avr in step S305. Then, the corrected laser power value is indicated to the laser driver 13. Thereby laser light having the corrected laser power is applied.

In steps S307 and S308, as in steps S204 and S205 in FIG. 10, there is a wait for a change of the reproduction object recording layer or a change in the recording state of a transmitting recording layer at the address corresponding to the present reproduction position, and when it is determined that the reproduction object recording layer is changed or that the recording state of a transmitting recording layer is changed, a return is made to step S302.

However, step S308 determines whether there is a change between three states, which are a state of certainly being a recorded region part, a state of certainly being an unrecorded region part (including a data unrecorded recording layer), and a state of being the vicinity of a boundary between the recorded region part and the unrecorded region part, as a change in the recording state of a transmitting recording layer. For example, the determination process of step S302 may use a result of determination as to a change between the three states in step S308.

Incidentally, while the average value avr in step S305 has been described above as an arithmetic mean, other average operations may be used. For example, a weighted average may be obtained according to a predetermined rule.

The configuration for laser power correction according to the present embodiment described thus far is suitably applied to reproduction supporting multilayer optical disks of three or more layers in particular. However, the configuration for laser power correction as the present embodiment can provide sufficient effects even when applied to optical disks of two layers. For example, as a result of applying the configuration for laser power correction according to the present embodiment to an optical disk of two layers, a need to narrow a range of specifications for a film forming the layers of the optical disk as in the related-art case is eliminated. Thus, for example, an effect of increasing a degree of freedom of selecting materials and characteristics of the film and the like is also obtained.

In addition, the configuration for laser power correction described thus far can also be applied at the time of recording.

The present application contains subject matter related to that disclosed in Japanese Priority Patent Application JP 2009-211287 filed in the Japan Patent Office on Sep. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing device comprising:
   laser light irradiating means for emitting laser light for reproduction, one of n (n is a natural number of two or more) layers formed in an optical recording medium being set as a reproduction object;
   correction coefficient information retaining means for retaining correction coefficient information including a correction coefficient for laser power, the correction coefficient being associated with a combination of a reproduction object recording layer and a recorded/unrecorded state pattern of each transmitting recording layer transmitting the laser light before the laser light reaches the reproduction object recording layer;
   correction coefficient obtaining means for:
      determining a recorded/unrecorded state pattern of each present transmitting recording layer by reflecting a result of determining whether a present region transmitting the laser light is a recorded region part or an unrecorded region part in each transmitting recording layer; and
      obtaining a correction coefficient corresponding to a combination of a present reproduction object recording layer and the recorded/unrecorded state pattern of each present transmitting recording layer of the present region from the correction coefficient information retaining means;
   laser power setting means for determining a correction coefficient for a reference value of the laser power for the laser light for said reproduction at least in part on a basis of the correction coefficient obtained by said correction coefficient obtaining means, and setting the laser power corrected by the determined correction coefficient;
   driving signal outputting means for outputting a driving signal for emitting the laser light from said laser light irradiating means so as to emit the laser light with the set laser power; and
   boundary determining means for determining whether a region transmitting the laser light is a region regarded as a vicinity of a boundary between a recorded region part and an unrecorded region part in each transmitting recording layer,
   wherein said correction coefficient obtaining means obtains, as a correction coefficient term, a correction coefficient corresponding to each possible recorded/unrecorded state pattern of each transmitting recording layer from said correction coefficient information in response to said boundary determining means determining that the region transmitting the laser light is the region regarded as the vicinity of said boundary, and
   wherein said laser power setting means determines the correction coefficient for the reference value of said laser power by an average value obtained from the correction coefficient term obtained by said correction coefficient obtaining means.

2. The reproducing device according to claim 1, wherein the correction coefficient of said correction coefficient information is set on a basis of total relative transmittance, wherein the total relative transmittance is light transmittance obtained at a time of a combination of the reproduction object recording layer and the recorded/unrecorded state pattern of each transmitting recording layer, the combination corresponding to the correction coefficient, and a total relative transmittance being obtained in a whole of transmitting recording layers supposing that the total relative transmittance, when all the transmitting recording layers are in a recorded state, is one.

3. A reproducing method comprising:
   a driving signal outputting step of outputting a driving signal for emitting laser light from laser light irradiating means for emitting said laser light, one of n (n is a natural number of two or more) layers formed in an optical recording medium being set as a reproduction object, and varying said driving signal so as to emit the laser light with a set laser power;
   a correction coefficient information retaining step of retaining correction coefficient information including a correction coefficient for the laser power, wherein the correction coefficient is associated with a combination of a reproduction object recording layer and a recorded/unrecorded state pattern of each transmitting recording layer transmitting the laser light before the laser light reaches the reproduction object recording layer;

a correction coefficient obtaining step of:
- determining a recorded/unrecorded state pattern of each present transmitting recording layer by reflecting a result of determining whether a region transmitting the laser light is a recorded region part or an unrecorded region part in each transmitting recording layer; and
- obtaining a correction coefficient corresponding to a combination of a present reproduction object recording layer and a recorded/unrecorded state pattern of each present transmitting recording layer from the correction coefficient information retained in said correction coefficient information retaining step;

a laser power setting step of determining a correction coefficient for a reference value of the laser power for the laser light for said reproduction at least in part on a basis of the correction coefficient obtained in said correction coefficient obtaining step, and setting said laser power corrected by the determined correction coefficient; and a boundary determining step for determining whether a region transmitting the laser light is a region regarded as a vicinity of a boundary between a recorded region part and an unrecorded region part in each transmitting recording layer;

wherein said correction coefficient obtaining step obtains, as a correction coefficient term, a correction coefficient corresponding to each possible recorded/unrecorded state pattern of each transmitting recording layer from said correction coefficient information in response to said boundary determining step determining that the region transmitting the laser light is the region regarded as the vicinity of said boundary; and wherein said laser power setting step determines the correction coefficient for the reference value of said laser power by an average value obtained from the correction coefficient term obtained by said correction coefficient obtaining step.

4. The reproducing method according to claim 3, wherein:
the correction coefficient of said correction coefficient information is set on a basis of total relative transmittance, wherein the total relative transmittance is light transmittance obtained at a time of a combination of the reproduction object recording layer and the recorded/unrecorded state pattern of each transmitting recording layer, the combination corresponding to the correction coefficient, and a total relative transmittance being obtained in a whole of transmitting recording layers supposing that the total relative transmittance, when all the transmitting recording layers are in a recorded state, is one.

5. A reproducing device comprising:
a laser light irradiating section configured to emit laser light for reproduction, one of n (n is a natural number of two or more) layers formed in an optical recording medium being set as a reproduction object;

a correction coefficient information retaining section configured to retain correction coefficient information including a correction coefficient for laser power, wherein the correction coefficient is associated with a combination of a reproduction object recording layer and a recorded/unrecorded state pattern of each transmitting recording layer transmitting the laser light before the laser light reaches the reproduction object recording layer;

a correction coefficient obtaining section configured to:
- determine a recorded/unrecorded state pattern of each present transmitting recording layer by reflecting a result of determining whether a region transmitting the laser light is a recorded region part or an unrecorded region part in each transmitting recording layer; and
- obtain a correction coefficient corresponding to a combination of a present reproduction object recording layer and a recorded/unrecorded state pattern of each present transmitting recording layer from the correction coefficient information retaining section;

a laser power setting section configured to determine a correction coefficient for a reference value of the laser power for the laser light for said reproduction at least in part on a basis of the correction coefficient obtained by said correction coefficient obtaining section, and set the laser power corrected by the determined correction coefficient;

a driving signal outputting section configured to output a driving signal for emitting the laser light from said laser light irradiating section so as to emit the laser light with the set laser power; and a boundary determining section for determining whether a region transmitting the laser light is a region regarded as a vicinity of a boundary between a recorded region part and an unrecorded region part in each transmitting recording layer;

wherein said correction coefficient obtaining section obtains, as a correction coefficient term, a correction coefficient corresponding to each possible recorded/unrecorded state pattern of each transmitting recording layer from said correction coefficient information in response to said boundary determining section determining that the region transmitting the laser light is the region regarded as the vicinity of said boundary; and wherein said laser power setting section determines the correction coefficient for the reference value of said laser power by an average value obtained from the correction coefficient term obtained by said correction coefficient obtaining section.

6. The reproducing device according to claim 5, wherein:
the correction coefficient of said correction coefficient information is set on a basis of total relative transmittance, wherein the total relative transmittance is light transmittance obtained at a time of a combination of the reproduction object recording layer and the recorded/unrecorded state pattern of each transmitting recording layer, the combination corresponding to the correction coefficient, and a total relative transmittance being obtained in a whole of transmitting recording layers supposing that the total relative transmittance, when all the transmitting recording layers are in a recorded state, is one.

* * * * *